Sept. 16, 1969 J. FEAT 3,467,781

APPARATUS FOR THE RECORDING AND REPRODUCTION OF MESSAGES

Filed Aug. 30, 1965 8 Sheets-Sheet 1

INVENTOR
JEAN FEAT
BY M. A. Hobbs
ATTORNEY

APPARATUS FOR THE RECORDING AND REPRODUCTION OF MESSAGES

Filed Aug. 30, 1965 8 Sheets-Sheet 2

INVENTOR
JEAN FEAT
BY
ATTORNEY

INVENTOR
JEAN FEAT
BY M. A. Hobbs
ATTORNEY

APPARATUS FOR THE RECORDING AND REPRODUCTION OF MESSAGES

INVENTOR
JEAN FEAT
BY M. A. Hobbs
ATTORNEY

APPARATUS FOR THE RECORDING AND REPRODUCTION OF MESSAGES

INVENTOR
JEAN FEAT

BY M.A. Hobbs

ATTORNEY

INVENTOR
JEAN FEAT
BY M. A. Hobbs
ATTORNEY

APPARATUS FOR THE RECORDING AND REPRODUCTION OF MESSAGES

Filed Aug. 30, 1965 8 Sheets-Sheet 7

INVENTOR
JEAN FEAT
BY M. A. Hobbs
ATTORNEY

INVENTOR
JEAN FEAT
BY
ATTORNEY

United States Patent Office 3,467,781

Patented Sept. 16, 1969

3,467,781
APPARATUS FOR THE RECORDING AND REPRODUCTION OF MESSAGES

Jean Feat, Paris, France, assignor to Crouzet, Valence, Drome, France, a French company Filed Aug. 30, 1965, Ser. No. 483,465
Claims priority, application France, Sept. 1, 1964, 986,817
Int. Cl. H04m *11/00*
U.S. Cl. 179—6 11 Claims

ABSTRACT OF THE DISCLOSURE

An apparatus for the recording and reproduction of messages which can selectively be dictated from a distance or locally, said apparatus being intended for use either as a dictating machine or in conjunction iwth a telephone station equipped with calling means and a telephone line transformer so as to provide a telephone-answering service, wherein said apparatus comprises two message recording and reading units, one of which has an endless magnetic band. Said band is actuated by driving means comprising one capstan drivable from an electric motor common to the said two units by means of engagement means comprising on the one hand, a set of wheels mounted on a common shaft in turn mounted in a displaceable shaft support and on the other hand a slidearm controlled by a cam of an automatic selector and operatively connected with said shaft-support.

One of the objects of the invention is to provide an improved arrangement of an apparatus of this type which enables the user to operate it at will, either as a simple call-answering station in order to announce the user's absence or as an answering station for recording messages of limited individual duration, or as a local-dictating machine.

Another object of the invention consists in incorporating in said apparatus a design feature which enables the user to record call-answering announcements for the telephone-answering service and, by direct listening-in, to monitor the texts of announcements thus recorded.

Yet another object of the invention consists on incorporating in said apparatus a design feature whereby the apparatus is automatically switched over to the state of a simple call-answering station when, after having been put in the condition of a call-answering and message-recording station, the recording medium for incoming messages is filled to maximum capacity.

A further object of the invention is a particular development of the preceding design feature wherein, when the apparatus is employed as a dictating machine, there is no limitation of the recording time for dictation.

An apparatus which is constructed in accordance with this invention is mainly characterized in that it consists in the combination of two recording units for recording on magnetic recording media, the recording medium of the first unit being of the endless type for recording and reading call-answering announcements i a telephone-answering service whilst the recording medium of the second unit is removably housed within the apparatus and serves to record either telephone messages or dictated texts, with a manual selector for selecting the conditions of operation of the apparatus in accordance with one of the three modes of operation hereinabove defined, and with an automatic sequential operation unit for the fuctions of call-answering and message-recording and/or call-answering only, for either full-time or part-time telephone-answering service.

The invention is described in detail hereunder with reference to the accompanying drawings which illustrate one example of embodiment which is not given in any limiting sense.

Figure 5:
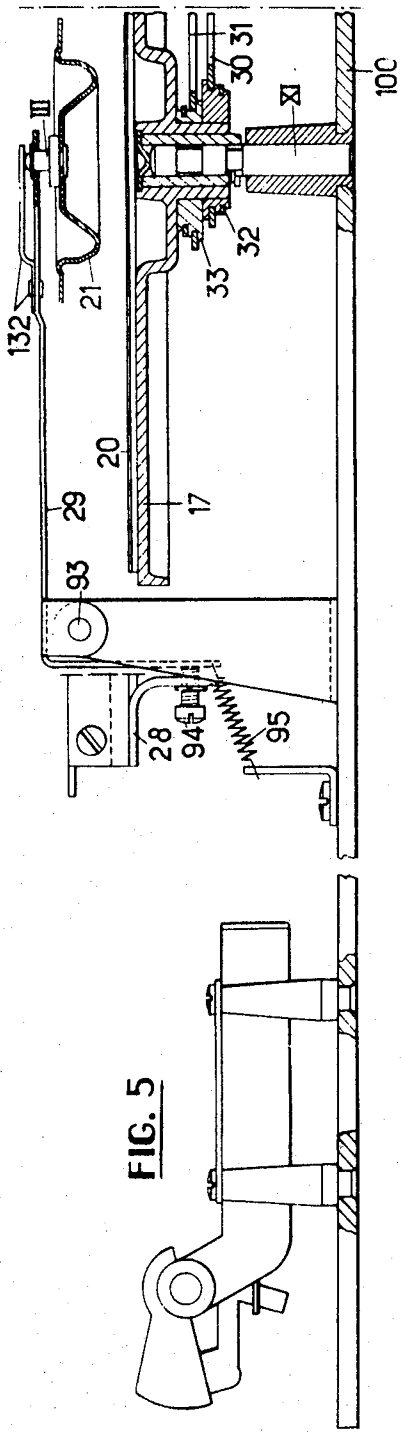
Figure 6:
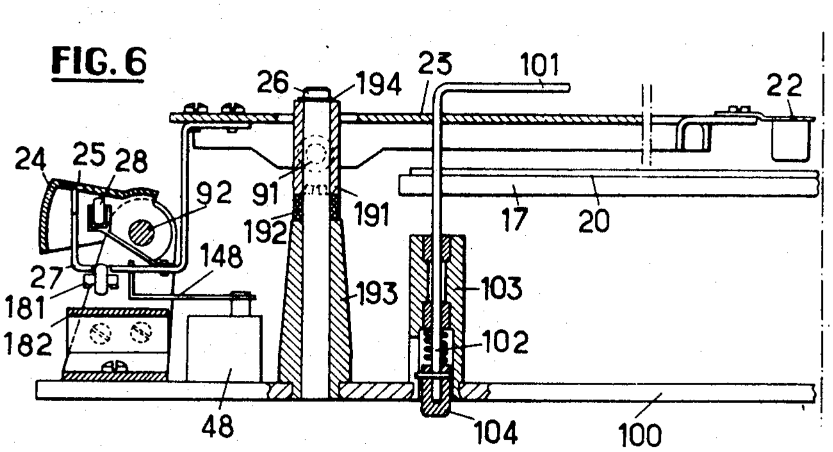
Figure 7:
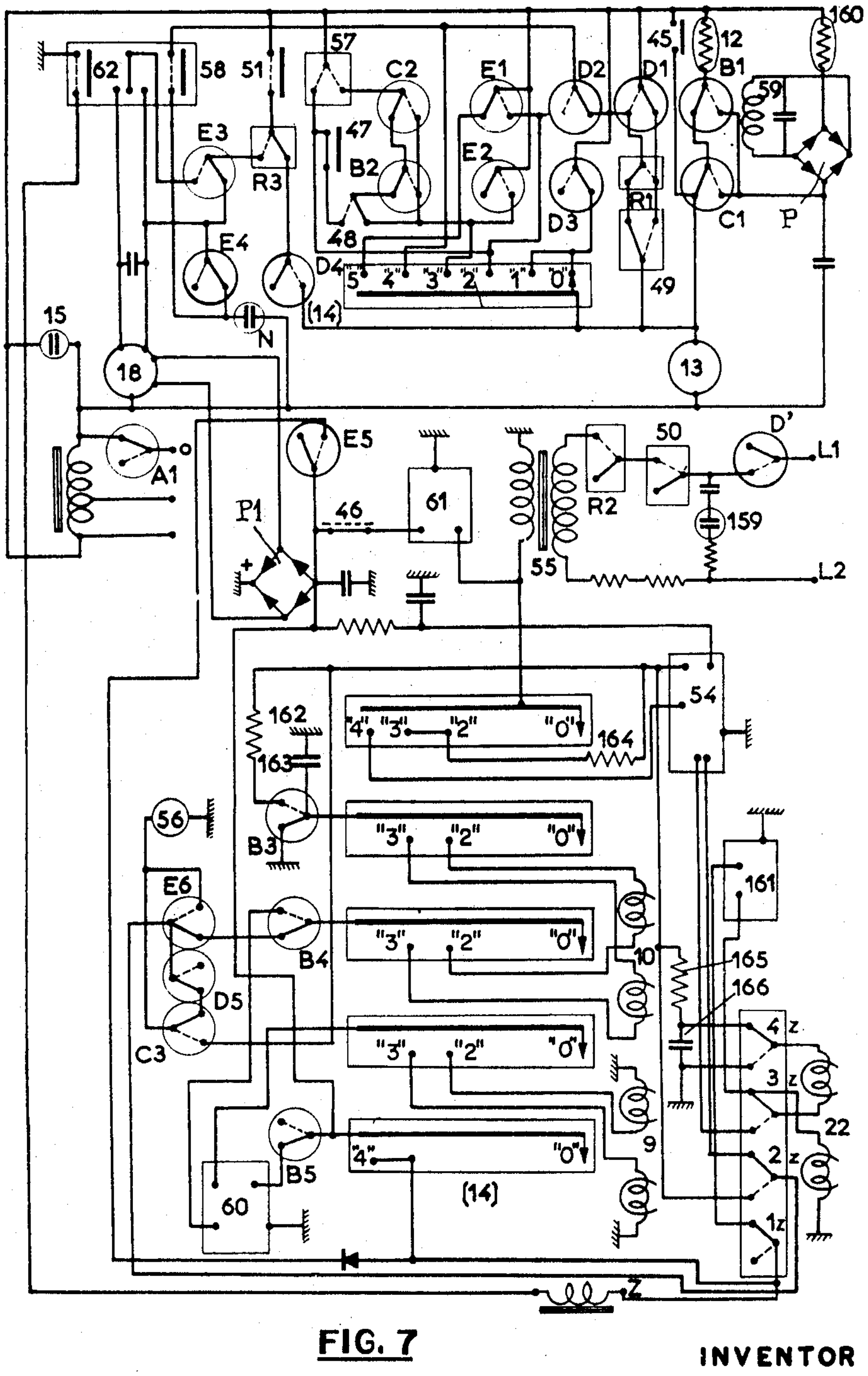
Figure 8:
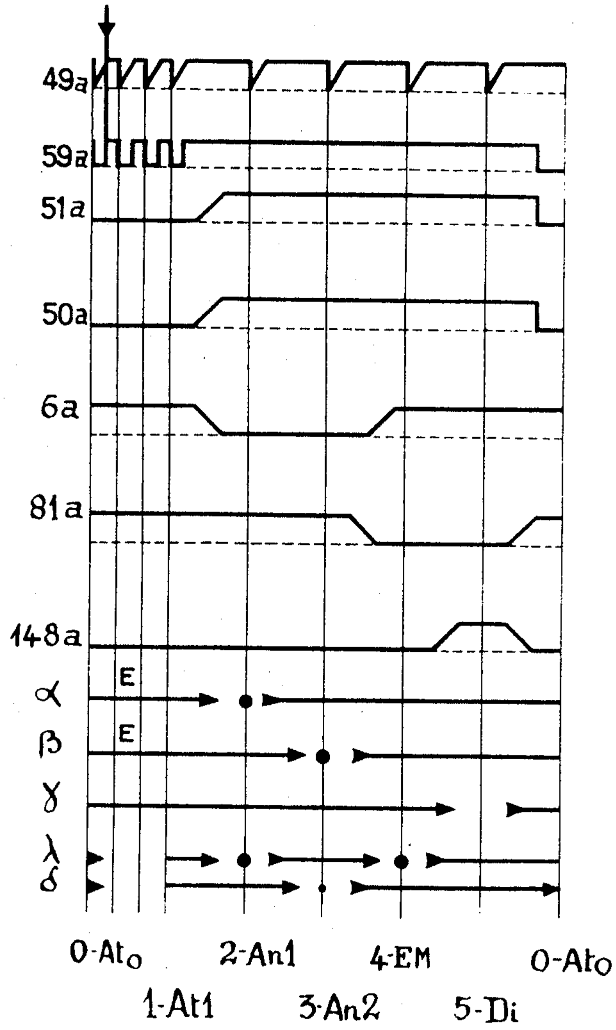

FIGS. 5 and *5a* (FIG. 5a being joined to the right-hand portion of FIG. 5) form together a developed view in false vertical cross-section of the apparatus, wherein said cross-section is taken through the axes of the mechanism for driving a magnetic tape which constitutes the first magnetic recording medium, through the engagement-disengagement device of said drive mechanism, through the axis of the turntable of the magnetic disc which constitutes the second magnetic recording medium, through the shaft which drives said turntable, through a motor which is common to both units, and through a portion of the turntable drive mehcanism;

FIGS. 6, *6a* and *6b* (FIG. *6a* being joined to the right-hand portion of FIG. 6 and FIG. *6b* being joined to the right-hand portion of FIG. *6a*) form together a developed view in elevation and partial cross-section of the mechanism for lifting the head-carrier arm of the second recording unit (recording on disc), of a mechanism for the safety-locking of said arm for transporting the apparatus, of the mechanism for engagement and disengagement of the disc turntable relatively to the driving motor, and of the automatic selector mechanism with cams and electric contact-wafers;

FIG. 7 represents an electric circuit diagram which serves to explain the operation of the apparatus in its different conditions of operation; and finally, FIG. 8 is a diagram of the programming sequences of the automatic selector of FIG. *6b*.

Figure 1:
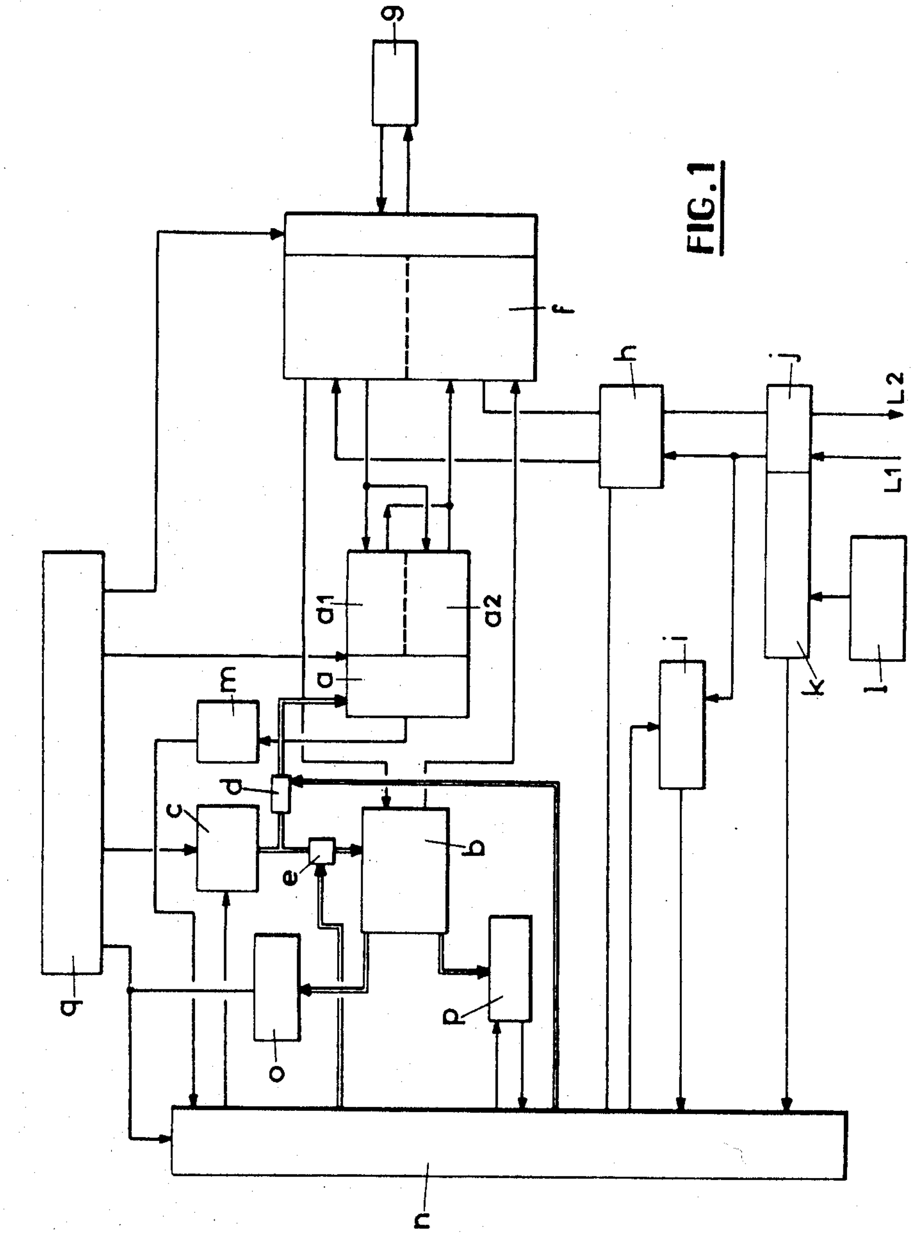
FIG. 1 is a simplified diagram (block diagram) of the apparatus.
Figure 2:
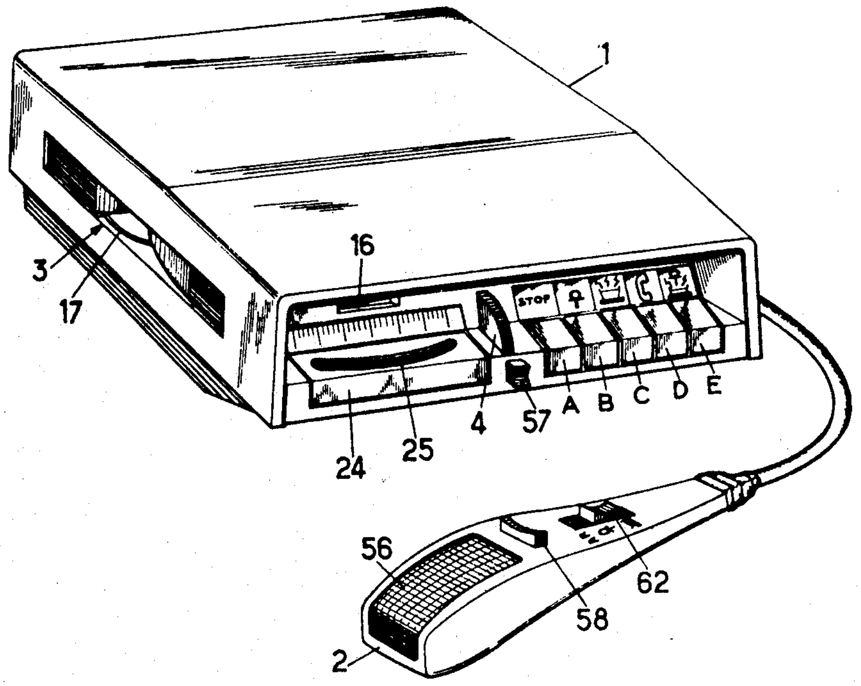
FIG. 2 is a view in perspective of said apparatus.

In the block diagram of FIG. 1, the double lines correspond to mechanical connections whilst the single lines correspond to electrical connections in which single-wire lines are shown in the interests of clarity.

As can be seen from the block diagram of FIG. 1, the apparatus comprises a first recording and reading unit *a* of the endless magnetic tape type in which one track of the magnetic tape is utilized as a simple call-answering unit *a*1 for informing callers of a subscriber's absence whilst a second track is utilized as a call-answering unit *a*2 for informing callers on the one hand of a subscriber's absence and, on the other hand, of the possibility of recording a telephone message of limited duration (30 seconds, for example).

A second magnetic-disc recording and reading unit *b* is employed for the purpose of recording and reading on the one hand one or a number of messages telephoned during a subscriber's absence and, on the other hand, texts dictated by said subscriber when the latter makes use of the apparatus as a dictating machine.

A single motor *c* is connected mechanically to the units *a* and *b* through the intermediary of coupling means *d* and *e* respectively, the units *a* and *b* being connectable to a single amplifier *f* (with the usual oscillators) which serves equally well for recording and reading and to which the remote-controlled telephone set *g* can be connected.

The telephone line L1, L2 terminates at the line transformer *h* and at an incoming call detector *i* by way of a safety switch *j* controlled by a safety device *k* which opens said switch in the event of failure of the current supply *l* and closes said switch again when said failure has been cleared.

Control means *m* which are responsive to a reference position of the endless magnetic tape of the unit *a* are connected to the motor of a programming selector $n$ fitted with control cams and rotary contact means.

The recording and reading means $b$ actuate on the one hand, when the recording medium (disc) of the unit $b$ is filled to maximum capacity, contactor means $o$ which are connected to the programming selector $n$ and, on the other hand, a message-time counter $p$ connected to said programming selector.

The different modes of operation of the apparatus are controlled by means of a keyboard $q$, the different keys of which actuate contactors, as will become apparent from the following description which relates to one specific and characteristic form of embodiment of the apparatus, said form of embodiment being illustrated in FIGS. 2 to 8.

It will be noted that, in the circuit diagram of FIG. 7, the positions of the moving contacts of the contactors as shown in full lines correspond to the rest positions ("normal" positions) whereas the positions of the same contacts as shown in broken lines correspond to the work positions.

In this form of embodiment, the apparatus is presented in the form of a box or case 1, the cover of which is so shaped as to receive the base of a telephone set if so required, although this is not an essential feature. Provision is made on the front face of the case for a row of keys A, B, C, D, E of the type which are self-locking and in which the depression of one key lifts all the others.

The depression of key A corresponds to the stoppage of the apparatus; in other words, when said key is pressed down, the apparatus is no longer supplied with the current and is consequently inoperative even when connected to a telephone set or to the mains supply.

When the key B is pressed down, the apparatus is conditioned so that the user can record his announcements by means of a low-speaker microphone 56 contained within a casing 2 and connected to the main case 1 by means of a cable in which are also grouped together the lead wires for controlling the operation of the driving motor 18 and for controlling the direction of operation and recording. With this object in view, the user is provided with a push-button 58 which is mounted on the casing 2 and which must be maintained in the depressed position during operation, and with a three-position slide-switch 62 (play-back, forward motion for reading or reproduction, and recording) as shown from front to rear in the diagram. An arrangement of this kind is well known in dictating machines.

In order to listen-in, and consequently in order to monitor recorded announcements, the key C is pressed down. For the purpose of recording and monitoring announcements as well as for dictation, the key E is pressed down; in addition, the user is provided at 4 with a volume control.

When depressed, the key D places the apparatus in the telephone-answering condition, namely in readiness for "call-answering only" in one position of the reversing switch 57 or for "call-answering and message-recording" in the other position of said reversing switch, as may be selected by the user.

There is formed in one of the sides of the case 1 an opening 3 through which can be seen a portion of the disc-carrier plate or turntable 17 which is designed to receive a magnetic disc 20 reserved for dictated and telephoned messages. Under normal conditions, any recording of this type is effected on a removable disc which the user places on the turntable; however, in order to provide against a possible oversight, provision can be made for a magnetic recording disc which is permanently bonded to said turntable so that the removable disc covers said permanent disc when deposited on the turntable.

Figure 4:
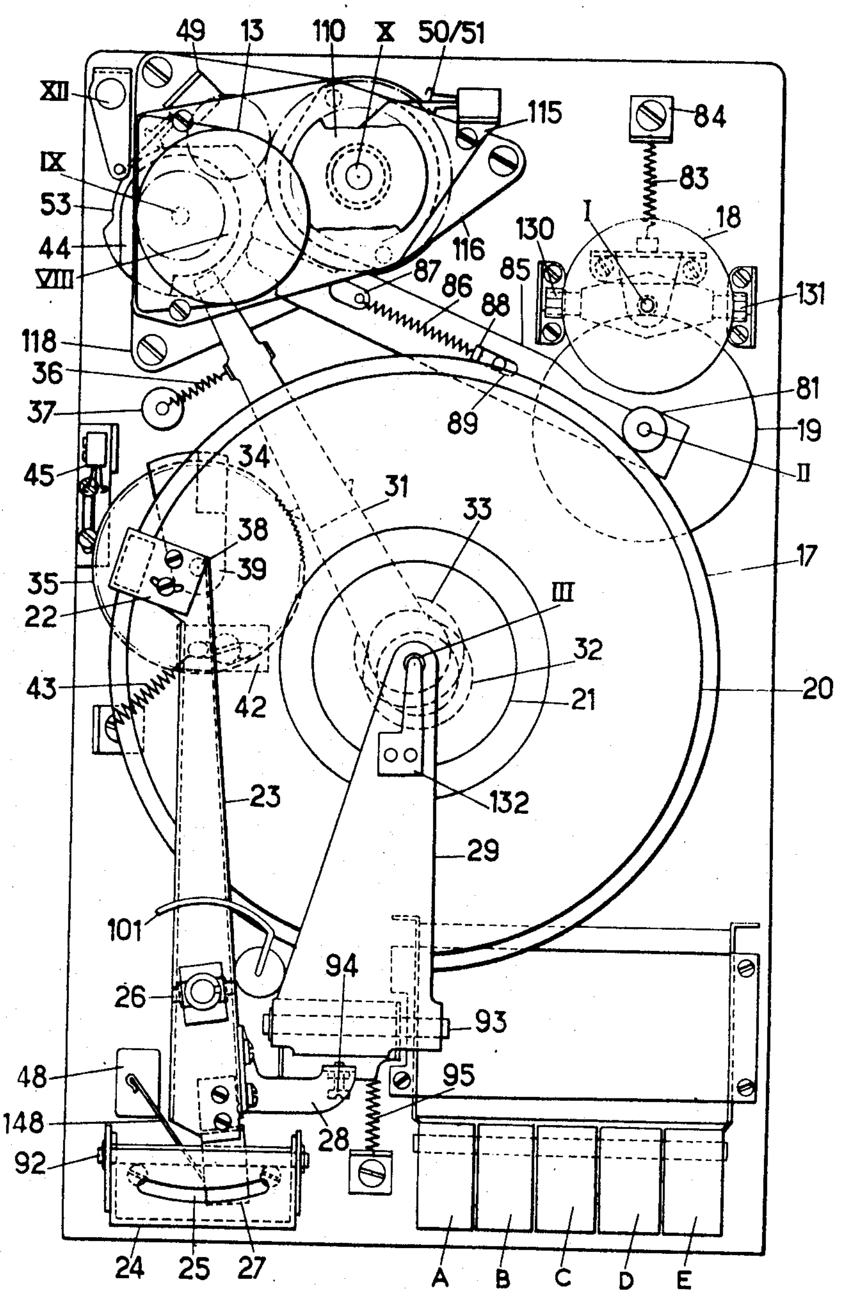
FIG. 4 is a plan view of the second recording unit for recording telephone messages or dictated texts.
Figure 5A:
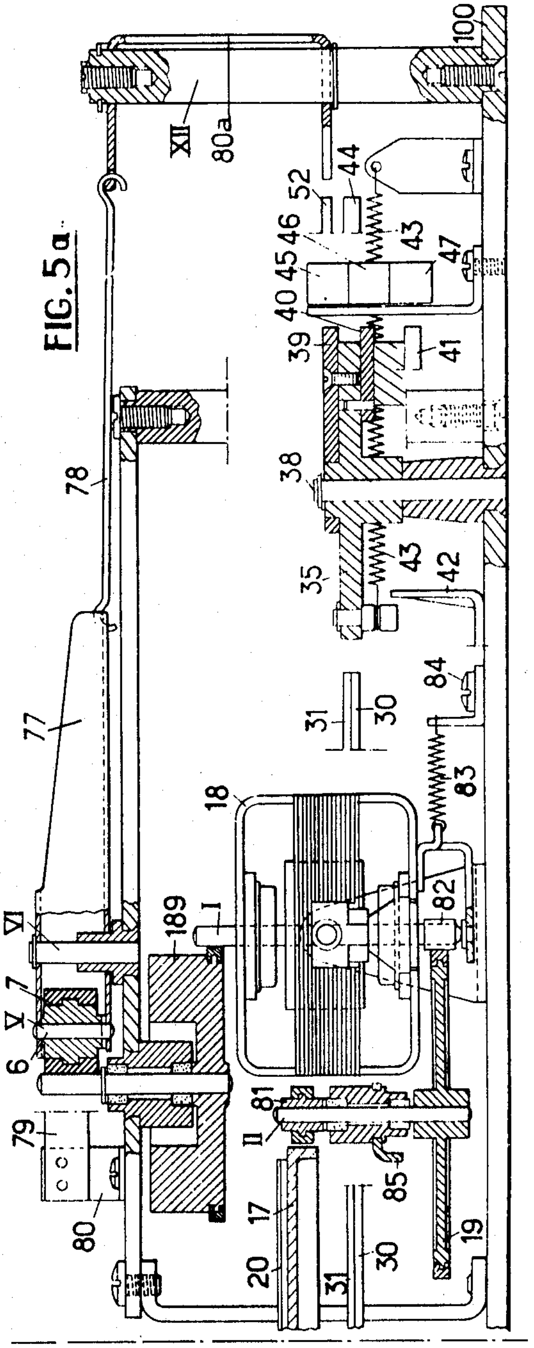

The disc 20 maintained on the turntable 17 by means of a central pressure plate 21 and the recording-erasing-reading head 22 is carried by an arm 23 which is pivoted at 26 and terminates in a manual-positioning finger 27 which is normally protected by a rocking-key 24. Said rocking-key must be lowered in order that said finger can appear through a slot 25 having the shape of a circular arc and formed in the top wall of said key 24 which is pivotally mounted on a cross-pin 92. The arm 23 carries a nose or lateral extension 28 fitted with an adjustable nut 94 (as shown in FIGS. 5, 5*a* and 4) which is adapted to come into abutting contact with a flange of the supporting arm 29 of the pressure plate 21 and produces action in opposition to a spring 95 which tends to maintain the pressure plate 21 applied against the turntable 17.

The pressure plate is carried by a spindle III, said spindle being in turn subjected to the pressure of a flat spring 132 which is fixed on the arm 29. The member 28 also constitutes a stop (as shown in FIG. 6) for the key 24. The arm 23 is pivotally mounted at 91 on a pillar 26 and the elbowed extension of said arm is integral with the finger 27. There is fixed beneath said finger a roller 181 and the bottom wall of the case 1 is provided in this zone with a guide surface 182 for said roller.

In order to displace the arm 29 and to lift the pressure plate (which constitutes a single operation), for example with a view to removing a disc 20 and replacing this latter by an unused disc, the user depresses the key 24 while pressing on the finger 27 and guiding said finger laterally in the desired direction in order that its roller 181 should follow the guide surface 182. The angular displacement of the arm 23 is permitted by virtue of its pivotal assembly on the spindle 26. As can be seen from FIG. 6, the arm 23 is carried by a sleeve 191 which is fitted over said spindle 26 and retained by a washer 194, a spring 192 being interposed between the sleeve and a pillar 193 which is attached to the bottom wall 100 of the apparatus. The attachment of the arm 23 to the sleeve 191 is carried out by means of members such as 91 so as to permit of its vertical motion. The user can therefore adjust the position of the arm on the magnetic disc at will without any danger of damaging said disc, and can change the magnetic disc 20 whenever he should so desire by pressing the key 24, thus simultaneously lifting the pressure plate and head-carrier arm.

In the message-recording or message-reading condition, the arm 23 performs a pivotal motion so that the multiple head 22 (recording, reading, erasing progresses from the periphery towards the center of the disc. However, when the head has reached the center of the disc, the finger 27 actuates a contact 48 by means of the pivotal lever 148. As will be explained in greater detail hereinafter, the closure of said contact is intended, in automatic operation, to prevent any further recording of telephone messages and consequently to put the apparatus in the "call-answering only" condition.

For the purpose of recording telephone messages, each message must have, as already mentioned, a predetermined time limit such as, for example, thirty seconds, while the disc 20 has, for example, a capacity of twenty messages. At the end of each thirty-second period, the disc must therefore be brought to a standstill. With this object in mind, provision has been made in the apparatus for a counting mechanism or meter which is designed and arranged as specified hereinafter, with reference in particular to FIGS. 4, 5, 5*a* and 6*b*. There are keyed on the axis of rotation XI of the turntable 17 two eccentrics 32 and 33 which actuate a pair of levers 30 and 31, the ends of which meet in order to cooperate with a cam 44 of the automatic program sequence selector. Said levers each carry a catch 34 which is adapted to engage with a toothed wheel 35 which is rotatably mounted at 38 and fitted with cams 39, 40 and 41, said cams being adapted to cooperate with contacts 45, 46 and 47 respectively. Each catch is held applied against the toothed wheel 35 by a spring 36 which is fastened at 37 in the case of each lever 30 and 31. The end of the levers is applied against the edge of the cam 44 and, as long as the said lever extremity remains in contact with the deep portion of the cam during the rotation of this latter, the toothed wheel 35 rotates steadily while the head 22 is displaced angularly towards the center of the disc 20. The contact 47 opens first, the function of said contact being to ensure reliable operation in the complete recording of messages. The contact 46 then closes; the function of said contact is to initiate the emission on the telephone line to the calling subscriber of a short sound signal which serves to warn the calling subscriber that he only has ten seconds left to speak. Finally, the contact 45 closes thirty seconds after the commencement of recording of the message; the function of said contact is to initiate the return of the apparatus to the stand-by position for a further call, the incoming call just recorded having thus been disconnected.

At the same time, the cam 44 has thrust back the levers 30, 31 and disengaged the catch 34 from the toothed wheel 35. As and when this disengagement takes place, the toothed wheel 35 is then urged back by the spring 43 so that a heel-shaped projection on said wheel comes into abutment at 42. In fact, the "counter" is reset to zero as a result of this operation. The cam 44 is stopped and the process will be repeated only at the time of the following incoming call. It should be noted that the contact 48 referred-to above is closed thirty seconds before the head 22 has reached the internal edge of the annular zone reserved for recording of the disc, so as to prepare the modification of the sequences of the selector. The subsequent opening of the contact 47 during the recording of the last recordable message produces the modification of sequence referred-to. Details of these operations will be explained hereinafter.

Figure 6A:
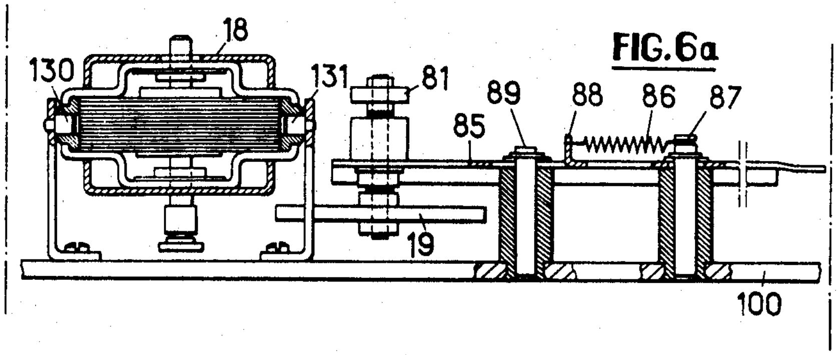

The driving of the turntable 17 from the motor 18 is effected as follows:

The motor 18 is mounted on pivotal bearings 130 and 131 and is continuously acted upon by a spring 83 which is attached at 84, so that the axis of said motor may thus be maintained vertical. The intermediate plate 19 carries a roller 81 which drives the turntable 17 when said plate 19 is engaged with the bottom roller 82 of the motor shaft. This engagement is made dependent on the control action of a slide-arm 85, the end of which follows a cam 53 of the automatic program selector. The slide-arm 85 is guided by two spaced pillars 87 and 89 and is provided with guide slots which enable said arm to slide in its own plane. Under normal conditions, said slide-arm is urged rearwardly to the position shown in FIG. 6*a* by a spring 86 which is attached between the top of the pillar 87 and a raised edge or flange 88 which is cut in the slide-arm. Said arm accordingly maintains the plate 19 applied against the roller 82 of the motor shaft 18 as long as it is permitted to do so by the deep portions of the cam 53. On the other hand, when a raised portion of the cam 53 comes opposite the end of the slide-arm, said cam then thrusts back said arm in opposition to the action of the spring 86, thus disengaging the plate 19 from the motor. As will be understood, this control by the selector cam 53 is eliminated when the apparatus is in the dictation condition since, in that case, the plate 19 is continuously driven by the motor 18 when this latter is rotating; the same applies in the message-reading condition.

A graduated scale can be fitted on the case of the apparatus, above the key 24, with a view to providing the user with a continuous indication, in conjuction with the position of a reference mark carried by the finger 27, of the message-recording capacity which remains on a disc 20 and, in a general manner, of the relative position of the head 22 with respect to the disc. The scale referred-to can be graduated either in number of messages (from 1 to 20 in the case considered) and/or in time duration.

For the purpose of positioning the disc 20 on the turntable 17, stops which have not been shown in the drawings can be provided on the turntable 17.

When the apparatus is placed flat on a table, the arm 23 must be free. But for transportation and handling purposes, said arm must be locked in position. To this end, provision has been made (as shown in FIGS. 4 and 6) for a locking system consisting of a rod 101 which is normally recalled by a spring 102 housed within a pillar 103. Said rod terminates in a push-plate 104 which projects beneath the base 100 of the apparatus. When the apparatus is being transported, the spring 102 applies the rod 101 against the arm 23, thus locking this latter in position. As soon as the apparatus is deposited, its weight compresses the spring 102 and the rod 101 moves upwards, thus releasing the head-carrier arm 23 since the push-plate 104 returns inside the bottom wall of the case.

Figure 3:
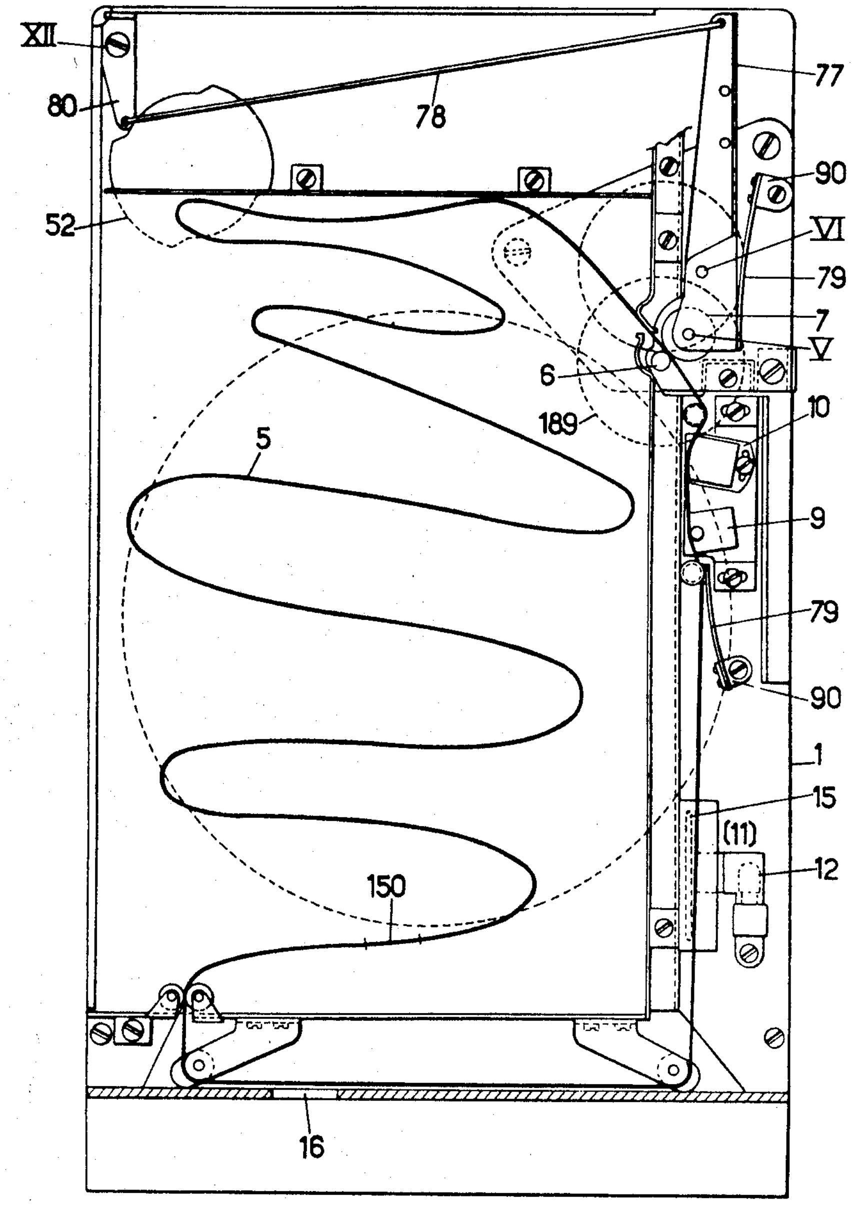
FIG. 3 is a plan view of the first recording unit for recording call-answering messages.

The first magnetic recording unit comprises (as shown in FIGS. 3 and 5*a*) a magnetic tape 5 which is looped in a zigzag configuration and which is of sufficient length (three meters, for example) to record two announcements along its length. The tape is of standard width (6.35 mm., for example) so that two announcement tracks placed side by side can be recorded thereon. The recording and reading head 10, which is designed accordingly, is a double head which is adapted to cooperate with the upper or lower track of the magnetic tape by virtue of an electric switching system; and the same applies to the erasing head 9. The said magnetic tape passes over guide rollers and beneath a flexible pressing strip 79 in order to be under tension as it passes through a passageway 11, on one side of which is placed a light source 12 and on the other side of which is placed a photoelectric cell 15. The tape has a transparent zone 150 and, as said transparent zone of said tape passes through the passageway 11, the photoelectric cell 15 responds by producing a signal for stopping the magnetic tape. The tape is driven by means of a capstan 6 mounted on an auxiliary plate 189 which engages with the shaft I of the motor 18. In order that the tape can be driven, a pressure roller 7 which is designed to rotate on a spindle V must be applied against the capstan. Said roller is carried by an arm 77 which is pivotally mounted on a pin VI and coupled by a tie-rod 78 to a rocker-arm 80 (as shown in FIGS. 3 and 5*a*) which is mounted on a bearing XII. The end of the rocker-arm 80 follows the profile of a cam 52 of the selector. When the photoelectric cell 15 detects the passage of the transparent section 150 of the magnetic tape, said photoelectric cell initiates the operation of the selector and the rotation of the cam 52 which effects the disengagement of the capstan pressure roller 7 as a result of the pivotal motion of the arm 77.

Figure 6B:
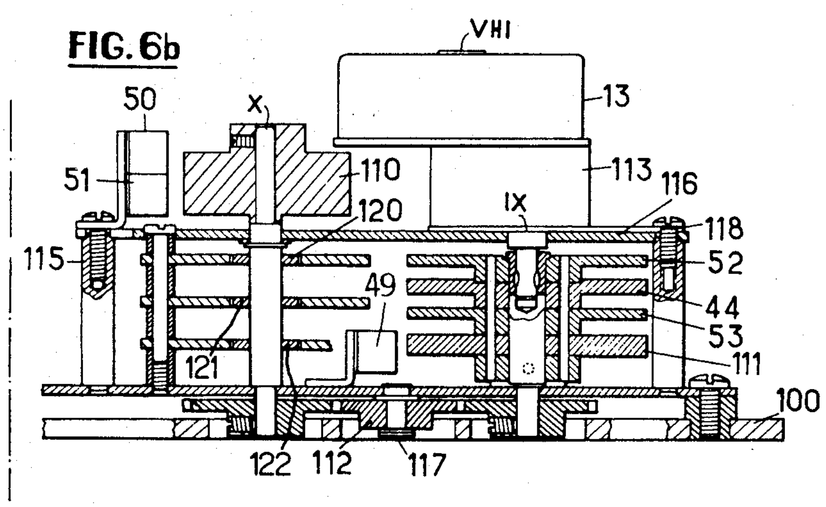

The selector unit (said unit being designated by the reference numeral 14 in the circuit diagram of FIG. 7) comprises, as shown in FIG. 6*b*, a driving motor 13 having an axis VIII which drives through a reduction unit 113 a shaft IX on which are mounted the cams 52, 44, 53 and a cam 111 which will be referred-to again below. Said selector also comprises an electric rotary switch and wafers or contact-discs 120, 121, 122 keyed on a shaft X which carries at the top portion thereof a cam 110 for controlling the contacts 50 and 51. The switch referred-to cooperates with the selecting cams by means of an intermediate pinion 112 (which rotates on a fixed shaft 117). The unit is supported by a mounting-plate 116 which is fixed on bearings such as the bearings 115 and 118. By operating the micro-switches 50 and 51, the cam 110 is intended to effect the termination of the telephone line and general supply, under conditions which will be defined later. The cam 111 actuates the micro-switch 49 which is adapted to the initial positioning of the program sequences.

The positions of the selector switch are shown in the circuit diagram of FIG. 7. These positions are:

A first position "0," which is the general stand-by position and corresponds to the condition of readiness for an incoming call (see FIG. 8);

A second position "1," which is also a stand-by position and corresponds to a condition of readiness for triggering the system for answering said incoming call;

Two "announcement" positions "2" and "3" which correspond to the times of delivery of announcements respectively in the case of answering-and-recording operation and answering-only operation, neither of said positions being worked simultaneously with the other;

A fourth position "4" which corresponds to the recording of messages and, finally, A fifth position "5" which corresponds to the operation of the apparatus as a dictating machine.

The apparatus is connected (as shown in FIG. 7) to the wires of the telephone line L1 and L2 in any condition other than dictation; for dictation purposes, the contact D′ which is interposed in the lead-in wire of L1 disconnects the apparatus from the line; this contact is actuated by means of the key D of the control keyboard of the apparatus. However, in either one or the other position of the key D, the apparatus is completely at rest if the contact A1 is not closed; this contact is opened as a result of the operation of the key A and effects the supply of the apparatus from the mains through an autotransformer which is provided with tappings for adapting the apparatus to the mains voltage. The switching contact A1 is interposed in the ground (earth) conductor and, when said contact is closed, connects said conductor to one supply terminal of each of the motors 18 and 13, to a neon tube N and, via a capacitive connection, to a bridge rectifier P which is intended to supply a line relay 59. However, said relay will only be energized when a photoresistance 160 which is inserted between its other pole and the high-tension lead-wire of the mains will be illuminated as a result of the lighting-up of a neon tube 159 which is energized by an incoming call, the resistance of the element 160 being too high when there is no illumination. It will be apparent that the neon tube 159 produces an optical-electronic action on the photoresistance 160. The relay 59 will also be supplied as a result of the energization of the neon tube N which also produces an optical-electronic action on the photoresistance 160, either when the push-button 58 is depressed by the user or when the circuit of contact 51 is closed by the contact R3 of the relay 59 as it moves to the work position and by the contacts E3 and E4 as they move to the rest position, said contacts being dependent on the "dictation" key E.

The relay 59 is also provided with a contact R2 for the purpose of terminating the line on the line transformer 55 when the contacts D′ (operated by the key D either in the answering-only condition or in the recording condition) and 50 are in the work position. The third contact R1 of the relay 59 serves to apply the alternating-current high-voltage to the contact 49 in the work position when the contact D1 is in the work position. It should be pointed out that, in the case of these contacts as in the case of the others, the work positions are indicated in broken lines and the rest positions are indicated in full lines.

The control circuits of the motors 18 and 13 will be described as the operations are explained, in reference to the different conditions of utilization of the apparatus. It should be noted that the motor 18 also serves as a transformer for delivering to a bridge rectifier P1 an alternating current voltage of the order of 12 volts, for example for supplying with direct current voltage the amplifier 54, the three oscillators 61, 60 and 161 and the dictation relay Z.

The amplifier 54 has a gain which is variable by means of the control knob 4, only in order to enable the user to listen-in (announcements and messages). Said amplifier has three inputs: one input is coupled to the position 4 of the wafer or contact-disc of the rotary selector switch which is connected by means of its bus bar to the secondary winding of the line transformer 55; the second input is connected to the resting contact 2*z* of the relay Z; and the third input is connected to the contact 3*z* of said relay Z. The output of the amplifier is coupled via the attenuator 164 to the positions "2" and "3" of the above-mentioned contact-disc of the rotary switch and via the attenuator 162 to the working contact B3, the contact-strip of which supplies the bus bar of one contact-disc of the rotary switch, the positions "2" and "3" of which are connected to the recording and reading heads of the two announcement tracks of the magnetic tape. A grounded (earthed) by-pass capacitor 163 is connected to the strip of B3. The output of the amplifier 54 is also coupled via the attenuator 165 to the working contact 4*z* of the relay Z, said attenuator 165 being connected to ground (earth) through the capacitor 166 whilst the ground is connected to the working contact 4*z* of the relay Z. The same output referred-to is directly connected to the working contact 2*z* of the relay Z. The "recording and reading" portion of the head 22 is connected between the strips of the contacts "4" and "3" and the "erasing" portion of said head is connected between the rest position of "3" and ground. The contact "2", when in the work position, will connect the output of the amplifier 54 to the microphone inset 56 which in that case operates as a low-speaker, either via the working contact of E6 or via the resting contacts of D5 and C3. Another output of the amplifier is connected to the working contact of C3.

The oscillator 60, which operates at 55 kc./s., for example, is used for the premagnetization of the announcement recording heads 10 through the intermediary of an output which extends through the working contact of B4 to the bus bar of the contact-disc of the rotary switch, the positions "2" and "3" of which are connected to said recording heads and the position "4" of which is connected to ground (earth). The oscillator 60 also serves to erase, by means of the double head 9, via an output which is coupled via the bus bar of another contact-disc of the rotary switch to the positions "2" and "3" which are connected to said head 9.

The oscillator 161, which operates at 15 kc./s., for example, performs a similar function in the case of the recording and erasing heads provided for the message discs, the output of said oscillator being connected to the resting contact "3*z*" of the relay Z and permanently connected to the erasing head of the head 22.

The output of the oscillator 61 (of the relaxation type) which operates at audio-frequency (450 c./s., for example) is connected to the line transformer 55. Said oscillator is triggered at each closure of a contact 46 so as to emit on the telephone line a short sound signal having a duration of 0.2 to 0.3 seconds.

The relay Z which is employed for dictating-machine operation only (contact E5 closed) is energized only when the user actuates the slide-switch 62 so as to connect said relay to ground.

The rectified voltage of 12 volts is also applied to the bus bar of another contact-disc of the rotary switch wherein the contact which corresponds to the position "4" is connected to the strip of contact 1*z* of the relay Z. A unidirectional element such as a diode is connected between the contact which corresponds to position "4" and the working contact of E5. (This balancing connection is optional).

A sixth contact-disc of the rotary switch comprises five contacts corresponding to five positions ("0" to "5"), the bus bar of said contact-switch being connected to a supply terminal of the motor 13. Said contact-disc, the wiring system of which will be explained in detail hereinafter in reference to the operation of the apparatus, is intended to effect the positioning of the selector 14. The rest position of said selector is that in which the motor 13 is stationary, the bus-bar contact being slightly in front of the contact "0." As each operation is carried out, whether by hand or automatically, the motor 13 will be fed so as to rotate until the bus-bar contact meets a contact which is not supplied with current, thereby stopping the motor 13 and placing the selector in position.

However, the starting of the motor 13 must be carried out each time from a rest position until the bus-bar contact meets a position stud which is supplied with current. Like the "call-answering" condition (key D depressed), this result will be ensured by means of the contact R1 of the relay 54 and the cam contact 49 in accordance with a process which will be explained below, these contacts being intended to "beat" or oscillate so as to ensure step-by-step motion of the motor 13. In the other conditions of operation (keys B, C and E), the motor 13 must be started-up when the key is fully pressed down. This can be ensured either by means of an electric contact which is specially provided for this purpose and actuated so as to close the motor circuit temporarily at the time of actuation of the key or alternatively, as in the case of the example herein described, by means of an electric contact as referred-to above which is also the contact 49.

In FIG. 6*b*, there can only be seen three contact-discs 120, 121, 122 of the rotary switch. However, each contact-disc is in fact double, inasmuch as the rotary switch energize the apparatus when this latter is at rest and to put on each face with a view to reducing the overall bulk.

The key A only serves, as previously mentioned, to energize the apparatus when this latter is at rest to put the apparatus out of service when this latter is in operation. Said key A could be replaced by a simple switch interposed in the supply lead of the apparatus or else could even be dispensed with altogether, in which case its function would be performed simply by plugging-in the apparatus. If provision is in fact made for this key, it need not be coupled mechanically to the other keys.

The key B serves for recording and monitoring of announcements by listening-in. The "announcement" selection is effected by operation of the reversing switch 57. In the left-hand position shown in the diagram of FIG. 7, the alternating-current supply is cut off at the contact-stud "2" whereas, in the right-hand position, the supply is cut off at the contact-stud "3." When the reversing switch is located in this position, the selector 14 will stop in the "first announcement" position, namely the position in which the subscriber is invited to dictatae a telephone message of thirty-second duration. When the reversing switch 57 is located in the left-hand position, the selector 14 will stop in the "second announcement" position, namely the position in which the calling subscriber is invited to call back after a period of time which may or may not be included in the announcement. Each announcement must of course provide identification of the station with which the apparatus is associated.

It will be assumed in the first place that the reversing switch 57 is in the right-hand position, in which case alternating-current high-voltage will be applied to the contact-stud "3" through the contact C2 which is in the rest position, and through the contact B2 which is in the working position, as soon as the key B is depressed. The microphone inset 56 is connected to the input of the amplifier 54 by way of the resting contacts C3, D5, E6 and 2*z* (of the relay Z in the rest position), but this amplifier is not yet under tension. The output of the amplifier is connected through the contactor B3, in the work position thereof, to the announcement recording head 10 which is also connected to the output of the premagnetization oscillator 60 by the contactor B4 in the work position of this latter. The erasing head 9 is connected to the output of said oscillator in each of the positions "2" and "3" of the selector 14, with the result that any announcement which has previously been recorded will be erased for the new announcement to be dictated by the user.

The contact B1, in its work position, prepares the stopping of the motor 18. The motor will accordingly come to a standstill when the photoelectric cell 12 is subsequently illuminated by the lamp 15 as the transparent section 150 of the magnetic tape 5 passes between these two elements. A certain time-lag will be necessary in order to ensure that said transparent section has passed beyond the position of the photoelectric cell at the moment when said motor comes to a stop. The magnetic tape 5 is provided with reference marks indicating the length (or time-duration) and visible through the viewing window 16 of the case, thus enabling the user to check the position of the magnetic tape both prior to and during the recording process. The magnetic tape is provided with a special reference mark (such as hatchings) and the user accordingly knows that he must begin to dictate his announcement only after the hatched portion of the tape has moved away from the window 16 and that his announcement must terminate before said hatched portion, which in fact surrounds the transparent section 150, reappears in said window. The waiting period prior to dictation will allow the relay 59 to be energized and the amplifier 54 and oscillator 60 to be supplied with direct current before the user begins to speak.

After having pressed the key B, the user takes hold of the combination handset which contains the microphone inset, places the slide-switch 62 in the "recording" position, then presses the push-button 58 until he observes the magnetic tape moving past behind the viewing window. The closure of the contact 58 initiates the supply of current to the neon tube N. Consequently, the relay 59 moves into the work position, the contact 58 applies via the resting contact D2 the alternating-current high-voltage to the neon tube N which lowers the resistance of the photoresistance 160 as a result of the illumination of said tube. Furthermore, the motor 18 has started up, having been supplied with current through the resting contact of E4; the result thereby achieved is that the direct-current voltage derived from the rectification of the alternating-current voltage of 12 volts is applied for the supply of the amplifier 54 and oscillator 60. The selector 14 is brought into position "2" if it is not already in this position, since the motor 13 as shown in the diagram has been supplied through the resting contact of D1 and the working contact of 49 (which is assumed to have been actuated by depression of the key, as already stated).

As soon as the bus-bar contact in position "0" is supplied through the resting contact of D3, the motor 13 continues to rotate, passes through position "1" which is also supplied with current and stops in position "2" which is not supplied with current.

When the magnetic tape has completed one full cycle during which the user has recorded one announcement (for example by repeating said announcement twice), the transparent section 150 of the tape arrives in front of the photoelectric cell 12, the resistance of which drops and, by means of the contact of B1 which is in the work position, short-circuits the relay 59, thus interrupting the self-energization of said relay and stopping the motor 18 as a result of the return of the contact R3 to the rest position, and consequently cutting off the supply to the amplifier 54 and oscillator 60.

Should the user desire to read back his announcement, he then presses on the key C without operating the reversing switch 57. The selector 14 accordingly remains in the "first announcement" position.

Assuming that, in the meantime, the user had manipulated the apparatus for the purpose of carrying out other operations, he would accordingly restore these conditions (key B depressed, reversing switch 57 in the right-hand position) and, at the commencement of the operation, the selector 14 would once again be in the "first announcement" position.

At the time of depression of the key C, the contact C1 takes the place of the contact B1 for the purpose of preparing the stoppage of the motor 18 as a result of the return of the relay 59 to the rest position; the contact C2 takes the place of the contact B2 for marking the position "2" of the selector 14, and contact C3 in the work position connects the microphone inset 56 to the output of the amplifier 54. By operating the combination handset 2, the user has set the slide-switch 62 in the position of forward motion for reading. The remainder of the operation is similar to that described for the recording. However, it will be apparent that the oscillator 60 is not connected into circuit since the contact B5 is at rest; there is therefore no danger of untimely erasing of announcements. During this operation, the microphone inset 56 operates as a low-speaker.

Recording and reading of the second announcement are entirely similar to those described in the case of the first announcement, but the reversing switch 57 is placed in the left-hand position. The selector 14 is accordingly brought into position "3" and it is the bottom portion of the stereophonic head 10 which comes into operation for recording the announcement message as dictated by the user on the lower track of the magnetic tape.

The user can leave the key B or C in the depressed position, in which case the selector remains in position "2" or "3" if the user does not operate the reversing switch 57. Should he desire to return the selector to the rest position, he will accordingly actuate the reversing switch 57 in such a manner as to supply current to the contact-studs which correspond to positions "2" and/or "3," that is to say in order to move the selector forward to position "4" which is supplied with current, from which position said selector will move to position "5" and return to the stand-by position.

In order to condition the apparatus as a telephone-answering station, the user depresses the key D, the contact D′ of which connects the line wire L1 to the rest contact-stud of the contact 50 and terminates the line L1–L2 by connecting the neon tube 159 into circuit. The contact D3 cuts off the alternating-current high-voltage supply to the contact-studs "0" and "1." The change-over of contact D1 to the work position initiates the supply of current to the motor 13 via the rest contact-stud of the relay 59 in order that the selector 14 should return to the stand-by position "0" if it is not already in this position. The work contact-stud of the contact D2 cuts off the supply of alternating current to the contact-stud "4" and also to the contact-stud "2." The conditions of the contact-studs "2" and "3" are defined by the position of the reversing switch 57 (it is assumed in the first place that the reversing switch is located in the right-hand position, the contact-stud "2" being marked for the stopping of the selector). The change-over of contact D4 to the work position prepares a circuit for the supply of current to the motor 13. The change-over of contact D5 to the work position breaks the connection between the contacts 6 and C3 which are in the rest position.

When an incoming call is received, the first ringing current energizes the neon tube 159 and therefore the relay 59 (see also FIG. 8). Since the contact 49 was in the work position by virtue of the action of the cam 111, the motor 13 rotates, thus returning the contact 49 to the rest position, with the result that the relay 59 trips; the motor is thus supplied with current, replaces the contact 49 in the work position, then stops. The second ringing current produces action in the same manner, followed by the third. But at the end of the feed motion thus imparted to the motor, the contact 51 closes and prolongs via D4 the supply of current to the motor so as to bring it into position "2." On completion of said feed motion, the contact 49 is no longer actuated by the cam 111. The beginning of the fourth ringing current places the relay 59 in the work position but, in that case, the neon tube N is supplied with current and the relay remains in contact in the work position. The contacts R2 and 50 are closed and thus terminate the line L1–L2. In position "2" of the selector 14, the "recording" portion of the head 10 is connected through the contacts B4 and E6 in their rest positions to one input of the amplifier 54 via the rest contact-stud 2z of the relay Z. The motor 18 rotates and since the tie-rod 78 is in the reading position, an announcement asking the calling subscriber to leave a message is transmitted on the telephone line, since the output of the amplifier 54 is connected to the transformer 55 and the cam which is coupled to the selector has engaged the announcement-tape capstan. When the transparent section 150 of the magnetic tape 5 reaches the photoelectric cell 12 on completion of one cycle, the resistance of said photoelectric cell falls temporarily; by means of the resting contacts B1 and C1, the motor 13 passes beyond position 2, then position 3 (since the contact-stud 3 is supplied with current), finally stopping in the telephone message recording position "4" which is not supplied with current.

The motor 18 continues to rotate since the line relay 59 remains energized but the capstan roller 7 is disengaged by the cam 52 whereas, on the contrary, the plate 19 is engaged by the cam 53 and the slide-arm 85. In position 4, the line transformer 55 is connected to the input of the amplifier 54 and the oscillator 161 is energized through the resting contact 1 of the relay Z, thus putting the head 22 in the recording condition for the disc 20. The output of the amplifier 54 which passes through the rest contact-stud of the contact 4z of the relay Z transmits the message to said head 22. The message which is dictated by the calling subscriber is therefore recorded. One second after the commencement of the recording, the contact 47 which was closed is opened in order to ensure that the recording is completed even if an untimely operation of the contact 48 were to occur in the meantime, this message being the last "recordable" message permitted by the capacity of the disc. The closure of said contact must in fact be carried out at the commencement of the recording of this last message, but its action must only be effective when the message is ended.

Ten seconds before the end of the message which is being recorded, the contact 46 of the mesage-time counting mechanism closes. Said counting mechanism comprises the ratchet wheel 35 and the elements associated therewith (levers 30 and 31). The closure of the contact 46 triggers the relaxation oscillator 61 which thus delivers a sound "pip" on the subscriber's line. After the thirty seconds have elapsed, the contact 45 of the mechanism for limiting the call time closes and remote-controls the motor 13 so as to transfer the selector to position "5" (dictation). During this change-over, the cam 44 resets the counting mechanism to zero and the cam 53 disengages the plate 19 from the motor 18 and disc turntable 17 which accordingly comes to a stop. The selector returns from position "5" to the stand-by position "0," the contacts 50 and 51 are opened and, as a consequence, the motor 18 stops; the line is disconnnected, the neon tube N is extinguished, with the result that the relay 59 is de-energized. The apparatus is in readiness for receiving another incoming call.

When the message disc has been filled to capacity, the contact 48 having changed over at the beginning of the last message as already mentioned, the contact 47 closes when the time-limiting mechanism returns to the inoperative position and when the selector returns to the stand-by position. When the contact 57 is located on the right-hand side, when the contacts C2 and B2 are in the rest position, when the contacts 48 and 47 are closed, the contact-stud of position "2" is supplied with current and the selector moves to the "second announcement" position (position "3") which is marked by the absence of alternating-current high-voltage as a result of the presence of the contact 48 in the work position. The apparatus will then respond only by sending the second announcement on the line and will return to the inoperative position at the end of the announcement cycle without stopping in position "4."

This condition in which the message disc is cut out of circuit obviously corresponds to the setting of the reversing switch 48 in the left-hand position. In this condition, there takes place for an incoming call the same sequence of operations as in the preceding case, aside from the stopping of the selector 14 in position "3" if not already in that position, and the transmission on the telephone line of the second announcement instead of the first. However, when the motor 13 is again operated as a result of the illumination of the photoelectric cell 12, the contact-stud corresponding to position "4" is supplied through the reversing switch, with the result that the motor will overstep this position then the dictation position so as to return to the stand-by position while stopping the motor 18 and disengaging the driving roller from the tape 5, whilst the relay 59 is also de-energized when the neon tube N is extinguished as a result of the opening of the micro-switch 51. The apparatus has thus returned to the condition of readiness for a further incoming call.

It will be noted that, in the condition of recording messages on a disc, not only has the calling subscriber heard a sound-signal warning him that he has only ten seconds left to speak but also, in view of the fact that the oscillator 61 is so designed as to emit such a sound signal at each position reversal of the contact 46, the calling subscriber has also been warned of the impending interruption of his call by the sound signal which is emitted at the time of re-opening of the contact 46 at the end of a message.

The reading of recorded messages (during the absence of the user of the apparatus) is carried out in the "dictation" position with the slide-switch 62 of the handset 56 in the "reading" position. As will be apparent, the user will previously have returned the head-carrier arm 23 by placing said slide-switch in the "play-back" position (without erasing). The same will apply in the case of reading or re-reading of messages dictated by the user himself.

The "dictation" condition is obtained by pressing down the key E of the keyboard. In this condition, the contact E1 in the work position marks the position "5" of the selector 14 whereas the contact-studs corresponding to the positions from "0" to "4" inclusive are supplied with alternating-current high-voltage via the resting contact D3 in the positions "0" and "1," via the working contact E1 in position "2," via the working contact E2 in position "3" (independently of the position of the reversing switch 57) and via the resting contact D2 in position "4." The contact E3 in its work position disconnects the direct circuit between the work contact-stud of the contact R3 and the lead-wire which supplies the motor 18 in forward motion whilst the contact E4 in its work position disconnects the neon tube from said lead-wire and from the rest contact-stud of the contact E3. The contact E3 in its work position prepares the energization of the dictation relay Z. The contact E6 in the work position connects the telephone inset 56 to the contact strip 2*z* of the relay Z and disconnects said strip from the head 10 which serves for recording and reading announcements. It should be noted that the inset 56 had been connected to ground (earth) in the telephone-message recording position and that the ground is also applied to the input of the amplifier 54, said input being intended to receive the dictated messages in order to prevent any recording of background noise during the recording of these messages.

As a result of the depression of the key E, the selector 14 has moved to position "5" in accordance with the process which is now apparent and which has already been explained in regard to the announcement recording and reading positions (the key E temporarily actuates the positioning contact 49 so as to bring this latter to the work position). For dictating or reading purposes, the user first places the head-carrier arm 23 for the message disc in the start position by operating the nose or lateral extension 28 by means of the finger 27, as has been explained earlier. The user than takes the hand microphone and presses the push-button 58 after having first placed the slide-switch 62 in the "recording" position or "reading" position. In the "dictation" position, the ground (earth) contact is not closed and the relay Z remains at rest, whereas, in the "reading" position, said relay Z is set in the work position.

In the rest position, not only the microphone 56 is connected to one input of the amplifier 54 but, in addition, the output of said amplifier is connected to the recording head via the rest contact-studs of the contacts 4*z* and 3*z* of the relay Z and the premagnetization oscillator will be energized in position "5" of the selector 14 through the rest contact-stud of the contact 1*z*.

When the relay Z is in the work position, the oscillator 161 is not energized, with the result that there is no danger of erasing the recording, and the output of the amplifier 54 is directed to the microphone insert 56 which then operates as a low-speaker by virtue of the work contact-stud of the contact 2*z* of the relay Z whereas the amplifier is supplied from the head 22 via the input which is connected to the working contact 3*z* of the relay Z, the working contact of 4*z* being in that case connected to ground.

As soon as the push-button 58 is depressed, the motor 18 is supplied and the amplifier 54 as well as the oscillator 161 in the "dictation" condition are set in operation. In fact, the initial operation of the pushbutton 58 has the effect of lighting-up the neon tube N, that is to say, of energizing the relay 59 and, by virtue of the change-over of the contact R3 to the work position, of supplying current to the supply contact-strip of the motor via the work contact-stud of the contact E3 (since the contact 51 is closed in position "5" of the selector), said motor contact-strip being brought onto its right-hand stud, with the result that the motor 18 rotates in the forward direction for the disc. The user then dictates or listens-in depending on the position of the relay Z as hereinabove defined. If the user releases the push-button 58, the neon tube N is extinguished and the relay 59 trips, thus cutting off the supply to the motor 18. Should the user decide to change over to the play-back position during either dictation or listening-in, he need merely operate for this purpose the slide-switch 62 of the combination handset 56 in order to hear a repetition of his own words or a repetition of a telephone message.

In position "5" of the selector 14, the time-limiter is cut out of circuit; the user can therefore dictate a message which covers the entire magnetic disc or listen consecutively to all of the telephone messages which have been recorded on the disc.

The stoppage of the motor 18 does not modify the position of the selector 14; the user can therefore change the disc as often as may prove necessary. In order that the selector should then be moved back to its stand-by position, the user need merely lift the key if this possibility is permitted, or press another key in order to effect the resupply, in position "5," of the selector. In either case, the selector will return to its stand-by position.

It will be noted that, in the apparatus which has just been described, one message space on the disc may remain unused in the call-answering and recording condition if the calling subscriber has failed to dictate a message when asked to do so, since the selector moves automatically to the message-recording position and is released therefrom only after the operation of the contact 45 of the recorded-call time-limiter.

Should it be found desirable to do so, the above disadvantage can be circumvented by duplicating the contact 45 by another contact which is actuated, only when the key D is depressed, as a result of absence of speech on the line or of modulation in the amplifier 54, when such an absence exceeds a predetermined number of seconds, e.g. 5 seconds, after the said amplifier has been put under tension. Simply and solely by way of example, the control system of the relay which is fitted with a working contact of this type could comprise a voltage integrator which is triggered by the application of the rectified voltage to the amplifier and which would accordingly actuate a monostable circuit such as a Schmitt trigger circuit; at the end of said five-second period, the relay winding is inserted in the output of said trigger circuit if the input of this latter is not inhibited by a signal derived from the output of the amplifier. As will be apparent, a working contact of the key D is interposed either upstream of the input of the integrator or in the control circuit of the relay in order that this circuit arrangement should be effective only in the answering and recording condition of the apparatus.

It will be noted that, in the event of failure in the mains supply occurring during conditioning as a call-answering station, the relay 59 is de-energized. When the mains supply is re-established, the line remains open at R2 but the motor 13 is started-up via the contact R3 which is in the rest position and the contact D4 which is in the work position, the device being thus brought to the stand-by position.

The sequences of the automatic selector 14 are clearly brought out by the diagram of FIG. 8 and do not require any special explanation.

The reference numerals which appear in this diagram, as considered from to bottom, designate the following functions:

49*a*—The operation of the contact-breaker 49 which is actuated by the cam 111;
59*a*—The operation of the relay 59;
51*a* and 50*a*—The operation of the contacts 51 and 50 respectively, which are actuated by the cam 110;
6*a*—The operation of the magnetic tape driving roller 6;
81*a*—The operation of the driving roller of the disc-carrier plate or turntable 17;
148*a*—The operation of the recording limiting lever 148;
α—"First announcement" operation;
β—"Second announcement" operation;
γ—"Dictation" operation;
λ—"Announcing" operation;
δ—"Call-answering" operation.

The reference numerals which appear from left to right have the following designations:

0–A*to*—That portion of the cycle which corresponds to initial stand-by;
1–A*t*1—That portion of the cycle which corresponds to subsequent stand-by;
2–A*n*1—That portion of the cycle which corresponds to the first announcement;
3–A*n*2—That portion of the cycle which corresponds to the second announcement;
4–EM—That portion of the cycle which corresponds to the recording of messages;
5–D*i*—That portion of the cycle which corresponds to dictation;

Among the alternative forms which can be considered within the scope of this invention independently of any modifications which may be made in the circuits and/or cams, there can be mentioned those which concern the actual form of magnetic medium adopted and those which therefore concern mechanical control means. By way of non-limitative example, either or both of these media can consist of an endless sheet which moves transversely to the path followed by the recording-reading-erasing head; each sheet is in that case supported by at least two rollers, one of which is a driving roller; the message sheet can be withdrawn laterally as in the case of the disc herein described, and the mechanism for limiting the duration of telephone messages could be controlled in dependence on a rectilineal displacement of the head instead of being dependent on an angular displacement as has been described; in the case of the announcement sheet, this latter could be associated with two heads remote from each other, one portion of the sheet being reserved for message-recording announcements and the other portion of the sheet being reserved for announcements as a simple call-answering station; at the end of travel, each head support could effect the disengagement of an opaque screen placed between a neon tube and a photoresistant cell for controlling the relay 59, in the energizing circuit of which the two photoresistant cells would be connected in parallel.

What we claim is:

1. An apparatus for the recording and reproduction of messages which can selectively be dictated from a distance or locally, said apparatus being intended for use either as a dictating machine or in conjunction with a telephone station equipped with calling means and a telephone line transformer so as to provide a telephone-answering service, wherein said apparatus comprises a casing in which are disposed: an automatic selector comprising electric motor means, mechanical cam-control means and electric contactor-control means, all of said control means being operatively connected with said motor means so as to be actuated thereby; a manual control selector comprising contactor elements; a first message recording and reading unit connected to the manual selector and to the automatic selector and having means for driving an endless stationarily magnetic tape for the purpose of moving said tape relative to recording and reading means; a second message recording and reading unit having other means for driving a removable magnetic disc so as to move said disc relative to other recording and reading means; a single electric motor connected to the manual selector and to the automatic selector so as to actuate the means for driving the said endless magnetic tape and the means for driving the removable magnetic disc; engagement means actuated from the mechanical cam control means of the automatic selector for positively coupling said single electric motor with said engagement means for driving the removable magnetic disc; further engagement means actuated from the cam control mechanism of the automatic selector for positively coupling said single electric motor with said means for driving the said endless magnetic tape; an amplifier fitting with a movable low-speaker microphone head having contactor-control means and with connections for coupling said amplifier to the line transformer; electric connections for coupling the recording and reading means of both message recording and reading units to said amplifier; connections for coupling the contactor elements of the manual control selector to the automatic selector, to the single electric motor, to the first message recording and reading unit and to the amplifier; call-signal detecting means connectable to the telephone line and connected to the contactors of the automatic selector; and supply means connected to the electric control means of said automatic selector, the fact that the means for driving said endless tape comprise at least one capstan, whilst the said engagement means comprise a set of wheels mounted on a common shaft in turn mounted in a shaft support which is displaceable so as to permit the engagement of said wheels in frictional contact with the said single electric motor and the capstan, and a slide-arm controlled by a cam of the automatic selector and operatively connected with said shaft support.

2. Apparatus as claimed in claim 1, wherein the means for driving said magnetic disc comprise a disc turntable whilst the other engagement means comprise a set of wheels mounted on a common shaft in turn mounted in a shaft support which is displaceable so as to permit the engagement of said wheels in frictional contact with the said single electric motor and the disc turntable, and a slide-arm controlled by a cam of the automatic selector and operatively connected with said shaft support.

3. Apparatus as claimed in claim 1, wherein the supply means comprise in the single motor an auxiliary winding which behaves as the secondary winding of a transformer, and a bridge rectifier which is connected to said auxiliary winding.

4. Apparatus as claimed in claim 1, said apparatus further comprising a line relay and a circuit for energizing said relay which comprises a photoresistant cell, a first lamp for energizing said cell and mounted on the subscriber's line, and a second lamp for energizing said cell and mounted in an energizing circuit which can be selectively controlled by a cam contact of an automatic selector and a working contact of said line relay and by the contactor means of the movable head of the low-speaker microphone.

5. Apparatus as claimed in claim 4, said apparatus further comprising: two de-energizing circuits connected in parallel with the energizing circuit of the line relay; means for limiting the recording time of telephone messages which are recorded on the removable magnetic disc; a short-circuit contact inserted in one of said de-energizing circuits and controlled by said means for limiting the recording time; a photoresistant cell interposed in the other de-energizing circuit; a lighting source for producing action on said photoresistant cell, and movable transparent screen which can be inserted between said lamp and said cell.

6. Apparatus in accordance with claim 5, wherein the endless magnetic tape is non-transparent, whilst the movable transparent screen consists of a section of transparent tape inserted in the endless magnetic tape.

7. Apparatus as claimed in claim 5, said apparatus further comprising: a light source which can be inserted in the subscriber's line and adapted to light up each time a call signal is delivered by the subscriber's line; a second photoresistant cell inserted in the line relay and responsive to the light shone by said light source in order that said relay should pulsate under the action of each call signal; a contact actuated by said relay and inserted in the circuit for supplying the motor means of the automatic selector.

8. Apparatus as claimed in claim 5, wherein the means for limiting the recording time of telephone messages comprise: two eccentrics mounted on the means for driving the removable magnetic disc; two connecting arms mounted on said two eccentrics and each fitted with a driving catch; a ratchet wheel operable by said catches; contactor means operable by said ratchet wheel and connected to the contactor means of the automatic selector so as to produce action on the supply circuit of the said motor means; elastic restoring means for returning said ratchet wheel to the starting position thereof; and a cam of the automatic selector for moving said connecting arms away from their position of engagement with said ratchet wheel.

9. Apparatus as claimed in claim 2, wherein the said first recording and reading means comprise: an erasing head; a recording and reading head; a stationary supporting column; an arm swingably mounted on said column and carrying said heads which are mounted on the free end thereof, said arm being provided, at the end remote from said free end, with an extension fitted with a lateral nose, said nose terminating in an operating finger and fitted with a runner-wheel which is displaceable on a stationary bearing surface when said operating finger is pressed down.

10. Apparatus as claimed in claim 9, said apparatus further comprising means for automatically locking and unlocking the arm in order to immobilize said arm during transportation of the apparatus and to release said arm when said apparatus is placed on a flat bearing surface, said automatic locking and unlocking means comprising: a guide bushing secured to the base of the apparatus casing; an elbowed rod, one section of which extends above the arm which carries the erasing, recording and reading heads and the other section of which is slidably fitted in said guide bushing; elastic means for causing that end of the rod section which is slidably fitted within said guide bushing to project from the base of the casing, for applying the other rod section against the arm in order to immobilize said arm as long as that extremity of the sliding rod section which is guided within said bushing projects from the base of the casing, and for moving said rod section away from said arm when the projecting portion of the rod is driven within the column by the flat bearing surface on which the apparatus is deposited.

11. Apparatus as claimed in claim 9, said apparatus further comprising, for the purpose of positioning and maintaining the disc on the turntable: another arm which is pivoted about an axis parallel to the plane of said turntable and which extends above said turntable towards the center thereof, said arm having an arm extension which is located behind the pivotal axis and which is operable by the lateral nose of the head-carrier arm; a central pressure plate mounted on the free extremity of said other arm substantially above the center of the disc turntable; elastic means connected to the casing of the apparatus and to the said arm extension for thrusting said pressure plate towards said turntable and locking the disc in position.

References Cited

UNITED STATES PATENTS

| | | | |
|---|---|---|---|
| 2,698,877 | 1/1955 | Abbott | 179—6 |
| 2,703,821 | 3/1955 | Kopp et al. | 179—6 |
| 3,050,585 | 8/1962 | Zimmerman | 179—6 |
| 3,293,365 | 12/1966 | Mitsui | 179—6 |
| 3,337,690 | 8/1967 | Martin | 179—6 |
| 3,310,629 | 3/1967 | Yamamoto et al. | 179—6 |

TERRELL W. FEARS, Primary Examiner

R. F. CARDILLO, Jr., Assistant Examiner

U.S. Cl. X.R.

179—100.1; 307—156